(12) United States Patent
Burton et al.

(10) Patent No.: US 7,681,773 B2
(45) Date of Patent: Mar. 23, 2010

(54) METHODS AND APPARATUS FOR RETRACTABLE PIN FRICTION STIR WELDING AND SPOT WELDING

(75) Inventors: Kurt A. Burton, Wildwood, MO (US); Michael P. Matlack, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/475,163

(22) Filed: May 29, 2009

(65) Prior Publication Data

US 2009/0236045 A1 Sep. 24, 2009

Related U.S. Application Data

(63) Continuation of application No. 11/325,086, filed on Jan. 4, 2006, now Pat. No. 7,581,665.

(51) Int. Cl.
*B23K 20/12* (2006.01)
(52) U.S. Cl. ..................... 228/2.1; 228/112.1
(58) Field of Classification Search ............ 228/2.1, 228/112.1
See application file for complete search history.

(56) References Cited

U.S. PATENT DOCUMENTS 5,718,366 A 2/1998 Colligan

| 6,053,391 | A | 4/2000 | Heiderman et al. |
| 6,722,556 | B2 | 4/2004 | Schilling et al. |
| 2002/0179673 | A1 | 12/2002 | Strombeck et al. |
| 2003/0201307 | A1 | 10/2003 | Waldron et al. |
| 2007/0152015 | A1 | 7/2007 | Burton et al. |

FOREIGN PATENT DOCUMENTS

DE 432832 C 8/1926
JP 2003305576 A 10/2003

OTHER PUBLICATIONS

International Search Report of PCT/US2007/000368; Jul. 19, 2007; 12 pages.

*Primary Examiner*—Jessica L. Ward
*Assistant Examiner*—Nicholas P D'Aniello
(74) *Attorney, Agent, or Firm*—Armstrong Teasdale LLP (57) ABSTRACT

An apparatus for friction stir welding is described that includes a stationary assembly having a bore therethrough, the bore having an inner diameter, and a rotational assembly having a welding end. At least the welding end of the rotational assembly extends through the bore. A portion of the rotational assembly is adjacent the inner diameter of the bore. At least one of the adjacent portion of the rotational assembly and the inner diameter of the stationary assembly are configured such that rotation of the rotational assembly will cause plasticized material from a welding process that has entered an area between the adjacent portion and the inner diameter to move towards a welding zone located proximate the welding end.

16 Claims, 8 Drawing Sheets

FIG. 8

# METHODS AND APPARATUS FOR RETRACTABLE PIN FRICTION STIR WELDING AND SPOT WELDING

CROSS REFERENCE TO RELATED APPLICATIONS

This application is a continuation application of patent application Ser. No. 11/325,086, filed Jan. 4, 2006 now U.S. Pat. No. 7,581,665.

BACKGROUND

This disclosure relates generally to welding processes and more specifically, to methods and systems to facilitate flash reduction and weld integrity in friction stir welding processes.

Friction stir welding is typically utilized for joining together work pieces of materials such as metals and plastics. A friction stir welding tool has a shoulder at its distal end and a non-consumable rotatable welding pin extending downward centrally from the shoulder. Some known friction stir welding tools include a shoulder fixed in position with respect to the pin and other known friction stir welding tools include a pin that is movable with respect to the shoulder.

In a typical friction stir weld operation, two work pieces are supported on a backing plate and are positioned so that the work piece edges where the weld is to be formed are held in direct contact to form an interface. The tool is then positioned so that the rotating pin is in contact with the work pieces at the interface. The rotation of the pin against the work piece materials produces a large amount of frictional heating in both the welding pin and the plate. This heat causes the work piece materials to soften in the vicinity of the rotating pin, which results in the formation of a weld.

In one form of friction stir welding, the tool is moved longitudinally along the interface between the two work pieces, thereby forming an elongate weld along the interface. The welding tool shoulder facilitates reducing softened, or plasticized, work piece materials from escaping upwards and away from the weld being formed. When the weld operation is completed, the welding tool is retracted.

Known drive apparatus are utilized to move, or drive, the welding tool along the weld path. One known drive apparatus includes a conventional milling machine used in metalworking. Such milling machines are particularly suited to maintain a fixed gap between the distal end of the pin tool and the surface of the backing plate. Another type of known drive apparatus is known as a "constant vertical force machine", and it applies a downward force along the vertical axis of the pin until a predetermined force is reached. This type of "constant vertical force" machine is particularly suited to maintaining a precise contact between the friction stir welding tool shoulder and the upper surface of the materials to be welded.

The above described friction stir welding processes are sometimes referred to as continuous path retractable pin tool welding. During such welding process, parent materials are heated to a plastic or malleable state. As explained above, as the parent materials soften, such softened materials tend to migrate or draw up between an outer diameter of the tool and an inner diameter of the shoulder holding the pin. As a result, some amount of the plasticized materials between the two surfaces escapes from the weld process, and such lost material is commonly referred to as flash. The volume of material that migrates away from the weld can sometimes cause anomalies such as voids and undesirable surface indentations.

Another known friction stir welding process is commonly referred to as friction stir spot welding. During friction stir spot welding, parent materials are heated to a plastic or malleable state. As these materials soften, they also tend to migrate up between the outer diameter of the tool shoulder and the inner diameter of a clamping anvil, allowing the plasticized parent materials between the two surfaces to escape from the weld process. As with the continuous path retractable pin tool welding process, the volume of material that migrates away from the weld can sometimes cause anomalies such as voids and undesirable surface indentations.

BRIEF DESCRIPTION

In one aspect, apparatus for friction stir welding is provided. The apparatus includes a stationary assembly comprising a bore therethrough, the bore comprising an inner diameter, and a rotational assembly comprising a welding end. At least the welding end of the rotational assembly extends through the bore. A portion of the rotational assembly is adjacent said inner diameter of said bore. At least one of the adjacent portion of the rotational assembly and the inner diameter of the stationary assembly is configured such that rotation of the rotational assembly will cause plasticized material from a welding process that has entered an area between the adjacent portion and the inner diameter to move towards a welding zone located proximate the welding end.

In another aspect, a method for reintroducing an amount of flash material migrating into an area between adjacent portions of a rotational assembly and a stationary assembly that substantially surrounds the rotational assembly back into a friction stir welding process is provided. The method comprises rotating the rotational assembly to form a weld, engaging flash material migrating into an area between the adjacent portions of the rotational assembly and the stationary assembly with a spiraling mechanism formed on at least one of an outer diameter of the rotational assembly and an inside diameter of the stationary assembly, and utilizing the spiraling mechanism in combination with the rotation of the rotational assembly to push the flash material back into a welding zone proximate the rotational assembly.

In still another aspect, a friction stir welding apparatus is provided. The welding apparatus includes a rotational assembly having an outer diameter, and a stationary assembly having an inner diameter substantially adjacent to the rotational assembly. At least one of the rotational assembly inner diameter and the stationary assembly outer diameter have material control threads in a direction opposite a direction of rotation of the rotational assembly.

In yet another embodiment, a method for material management in friction stir welding processes is provided. The method comprises providing a friction stir welding apparatus comprising a rotating tool within a sleeve, configuring the rotating tool to rotate in a first direction, and outfitting at least one of the rotating tool and the sleeve with at least one of a material control groove and a material control protrusion spiraling in a direction counter to the direction of rotation of the rotating tool.

DETAILED DESCRIPTION

Figure 1:
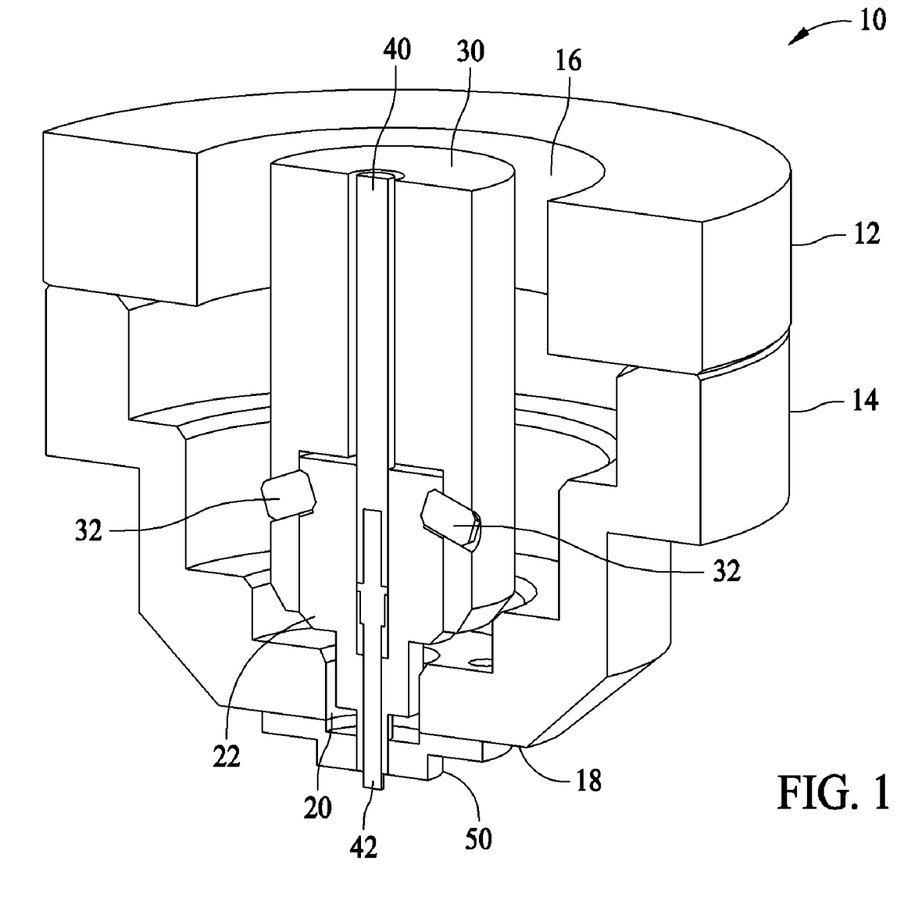
FIG. 1 is a cross-sectional view of a friction stir spot welding device.

FIG. 1 is a cross-sectional view of a friction stir spot welding device 10. Spot welding device 10 includes a spindle housing 12 attached to a clamping housing 14. As illustrated in FIG. 1, spindle housing 12 and clamping housing 14 define a cavity 16. Cavity 16 extends through a bottom 18 of clamping housing 14 and defines a bore 20. A shoulder tool 22 is configured to be inserted into bore 20. Shoulder tool 22 is held in place by a shoulder spindle 30 and locking screws 32. Shoulder spindle 30 has a bore therethrough in which is held a pin spindle 40 and a pin tool 42. Pin tool 42 and shoulder tool 22 extend through bore 20 of clamping housing 14 and are retained in place by a clamping anvil 50.

Figure 2:
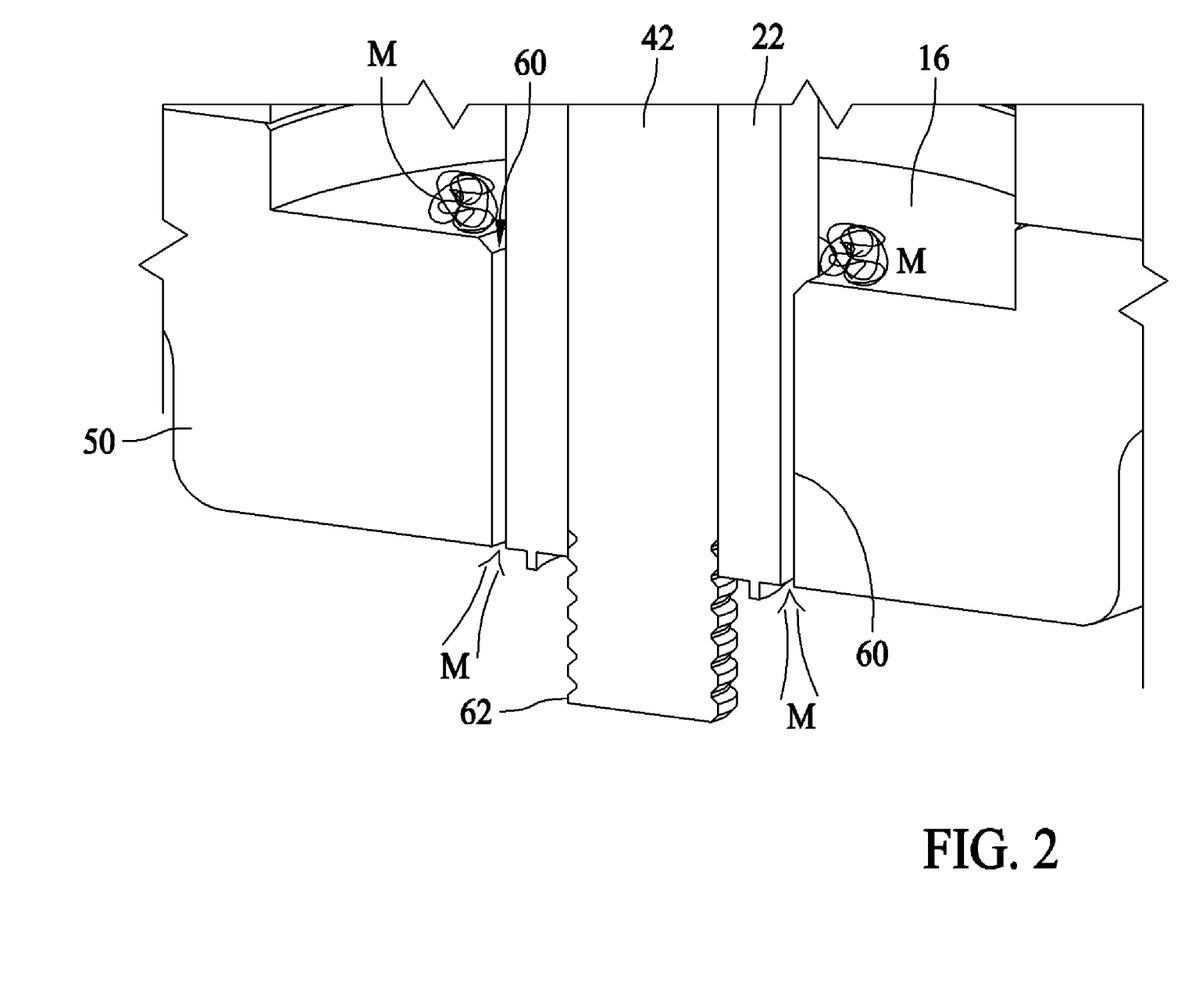
FIG. 2 is a detailed cross-sectional view of a clamping anvil, shoulder tool, and pin tool for the friction stir spot welding device of FIG. 1, illustrating migration of plasticized material.

FIG. 2 is a detailed cross-sectional view of clamping anvil 50, shoulder tool 22, and pin tool 42 of friction stir spot welding device 10, and illustrates migration of plasticized material. In one embodiment, shoulder tool 22 and pin tool 42 rotate counterclockwise when engaging a material to be spot welded. This process softens or plasticizes the material to be welded and a portion of this material M tends to migrate through a narrow passageway 60 between clamping anvil 50 and shoulder tool 22. A portion of this material M may migrate all the way to cavity 16. Migration of this material away from the welding zone results of a loss of material M at the welding zone (adjacent a welding end 62 of pin tool 42) which may lead to surface anomalies and other indentations in the parts that are being welded.

Figure 3:
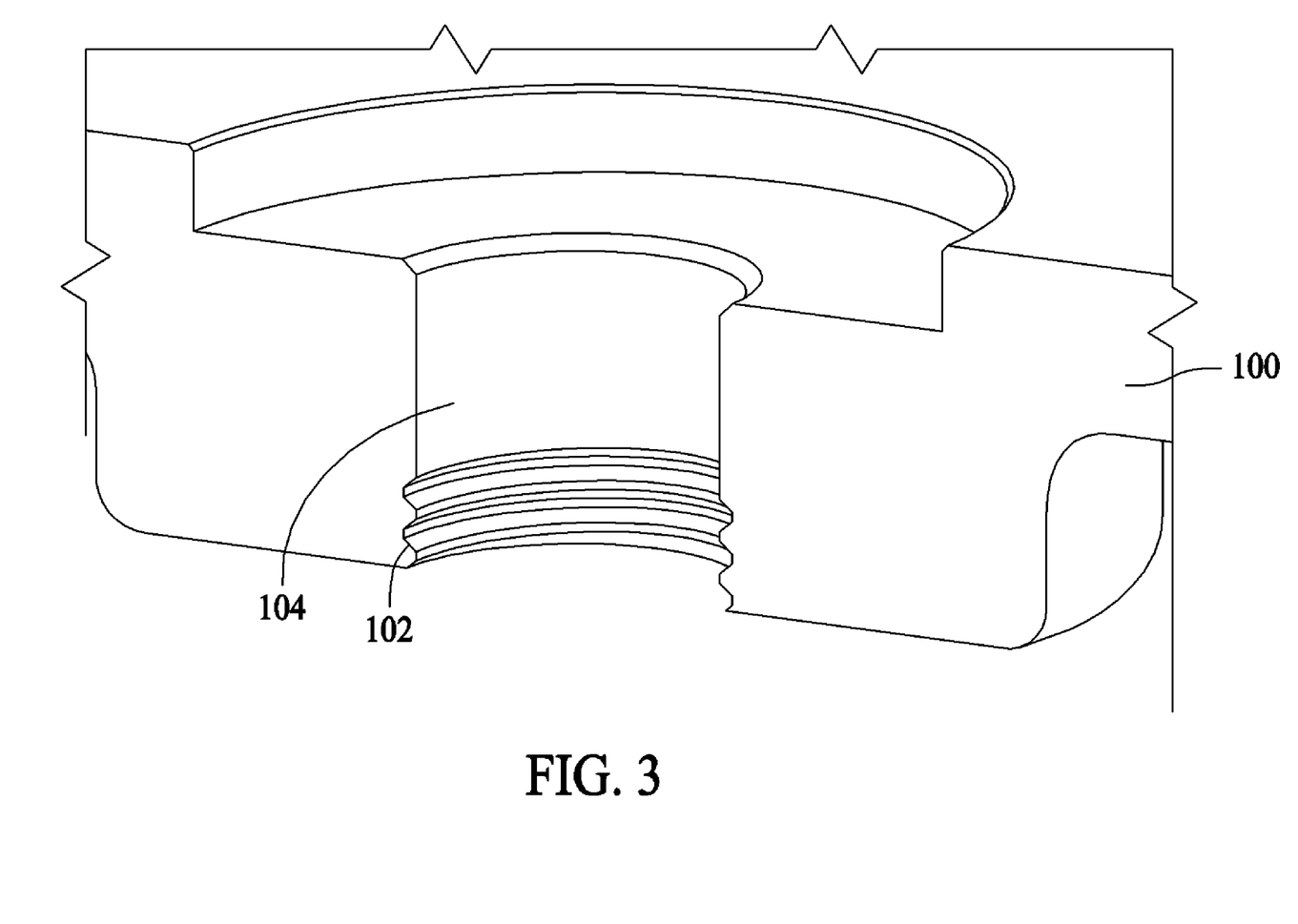
FIG. 3 is a detailed cross-sectional view of a clamping anvil configured with helical grooves therein.

FIG. 3 is a detailed cross-sectional view of a clamping anvil 100 configured with helical grooves 102 therein. Helical grooves 102 define a threaded area located on an inner diameter 104 of clamping anvil 100, concentric to the outer diameter of the shoulder tool (not shown in FIG. 3). Helical grooves 102 provide a mechanism through which material migrating up through passageway 60 (shown in FIG. 2) is forced back down into a welding zone adjacent pin tool 42. Helical grooves 102 are sometimes referred to as material control grooves. The counterclockwise rotation of pin tool 42 and shoulder tool 22 results in material migrating through the narrow passageway 60 as shown in FIG. 2. The rotation of the material in passageway 60 coupled with grooves 102 results in the material being pushed, or forced, back down into the welding zone adjacent a welding end 62 of pin tool 42. In a specific embodiment, grooves 102 are approximately 0.017 inch in depth and have a pitch of 0.005 inch.

Figure 4:
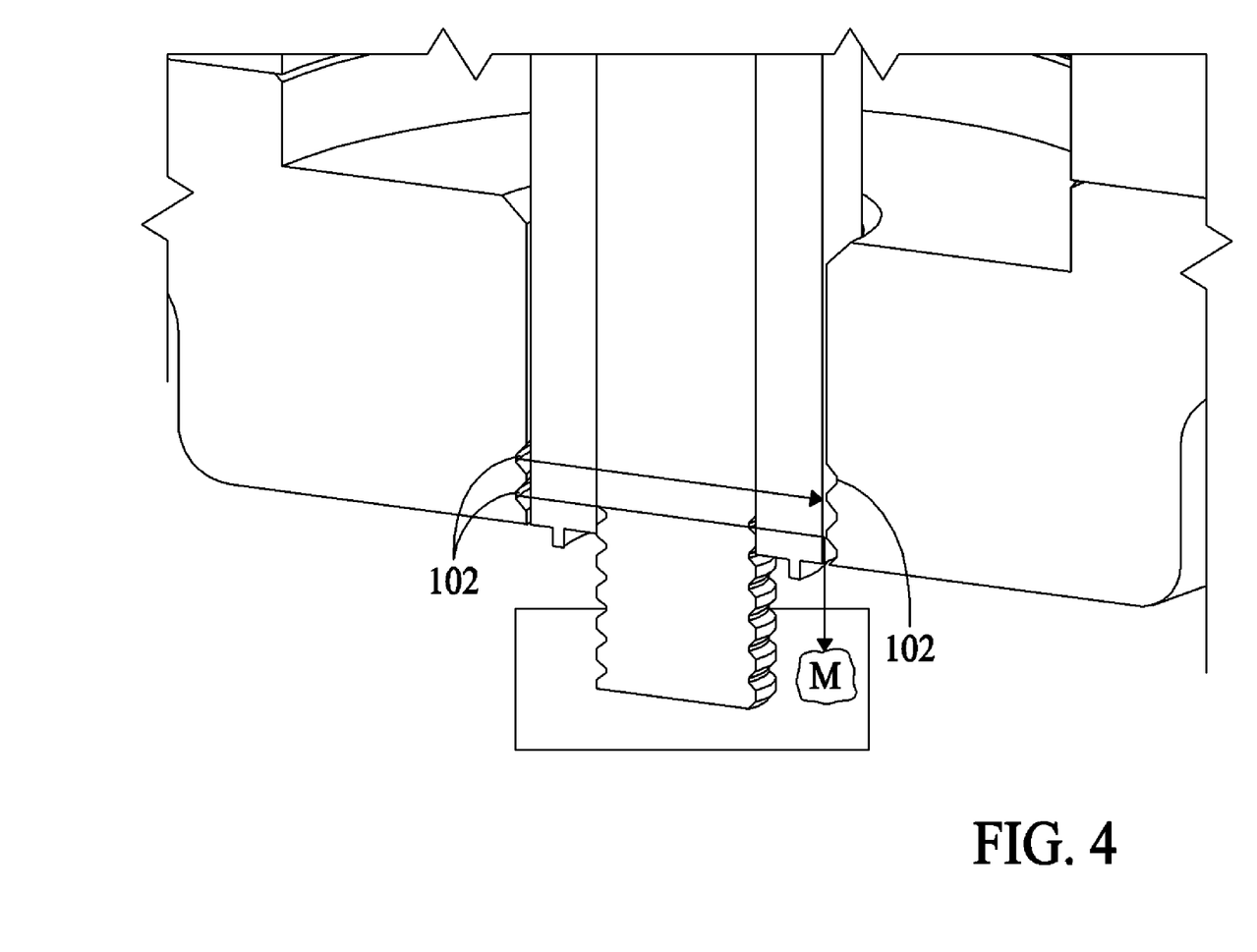
FIG. 4 is a detailed cross-sectional view illustrating an effect of the helical grooves on the migration of plasticized material.

FIG. 4 is a detailed cross-sectional view of clamping anvil 100, shoulder tool 22, and a pin tool 42, and illustrates an effect of helical grooves 102 on the migration of plasticized material M. In FIG. 4, shoulder tool 22 is illustrated as rotating and clamping anvil 100 is fixed (non-rotating). Shoulder and pin friction stir welding tools 22 and 42 can be independently driven or linked together to the same drive spindle (e.g. shoulder spindle 30 shown in FIG. 1). The pin and shoulder tools 22 and 42 are rotating before pin tool 42 is inserted into the interface between the materials to be welded. As pin tool 42 proceeds to a preprogrammed position or depth, material M (i.e., flash) is volumetrically displaced around pin tool 42. Material M migrates between the shoulder tool outer diameter and the clamping anvil inner diameter. As shown in FIG. 4, rotation of shoulder tool 22 and grooves 102 formed within clamping anvil 100 work concurrently to push or pump material M back into a welding zone 110, thereby reducing flash material. With respect to friction stir spot welding devices, pin tool 42 and shoulder tool 22 are sometimes collectively referred to herein as a rotational assembly, and clamping anvil 100 is sometimes referred to as a stationary assembly.

Figure 5:
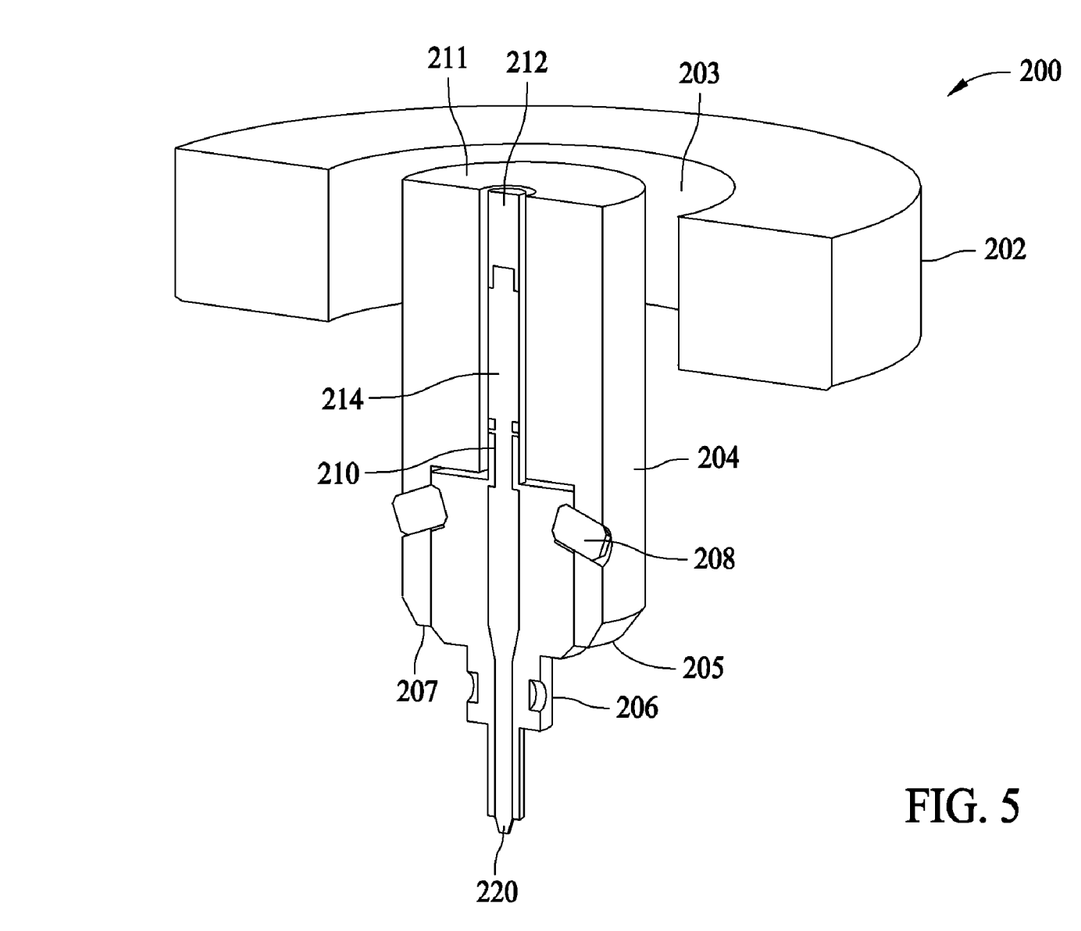
FIG. 5 is a cross-sectional view of a retractable pin tool friction stir welding device.

FIG. 5 is a cross-sectional view of a retractable pin tool friction stir welding device 200. The friction stir welding device 200 includes a spindle housing 202 having a bore 203 there through. Within bore 203 is located a shoulder spindle 204. Extending from a bottom 205 of shoulder spindle 204 is a shoulder tool 206. An upper portion of the shoulder tool 206 is fixed within a larger diameter bore 207 within shoulder spindle 204 by locking screws 208. Of both the placement of shoulder tool 206, a smaller diameter bore 210 extends through shoulder spindle 204 from shoulder tool 206 through a top 211 of shoulder spindle 204. Within bore 210 is located a pin spindle 212 from which extends an upper portion of a pin tool 214. Pin tool 214 extends through a portion of shoulder spindle 204 and all the way through the shoulder tool 206. Pin tool 214 rotates and a bottom section 220 of pin tool 214 engages the materials to be welded as further discussed below.

Figure 6:
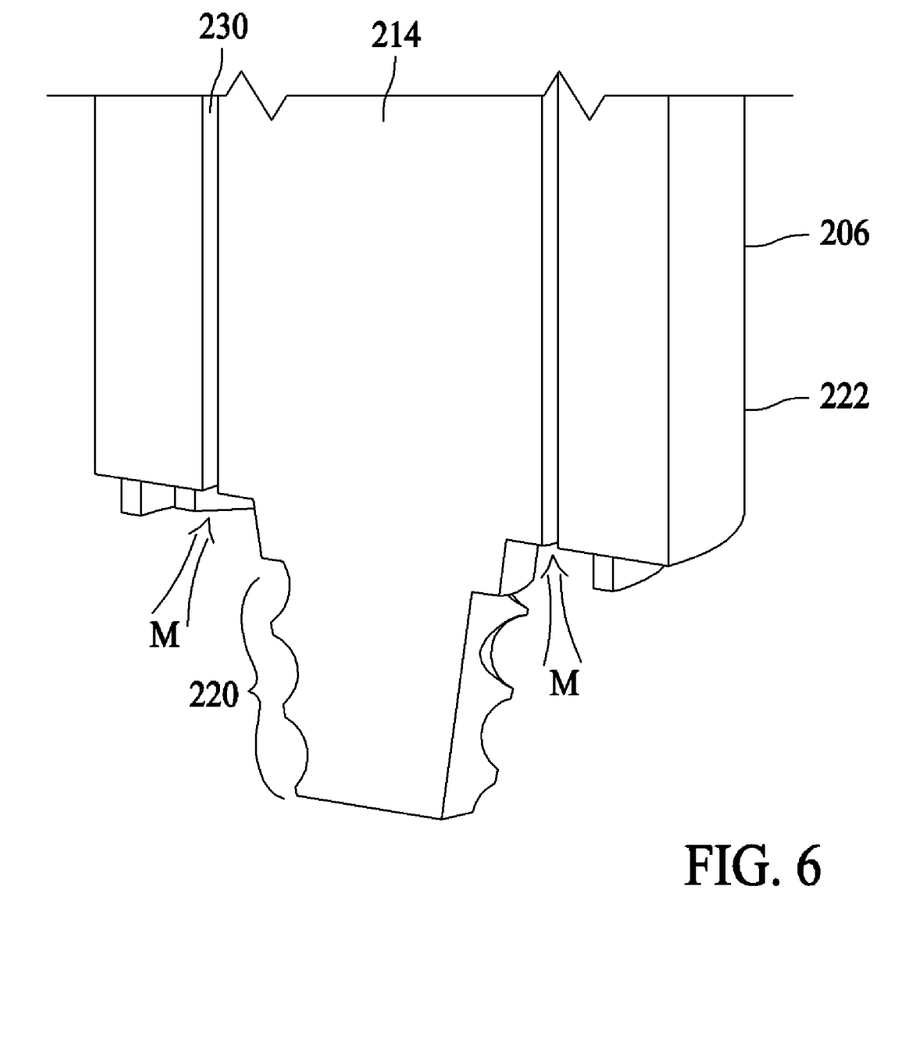
FIG. 6 is a detailed cross-sectional view of a shoulder tool and pin tool for the friction stir welding device of FIG. 5, illustrating migration of plasticized material.

FIG. 6 is a detailed cross-sectional view of a bottom portion 220 of pin tool 214 and a bottom portion 222 of shoulder tool 206 of the friction stir welding device 200 of FIG. 5. FIG. 6 further illustrates, migration of plasticized material M. Retractable pin tool friction stir welding device 200 is utilized in a continuous welding path and pin tool 214 is configured in one embodiment to rotate with respect to shoulder tool 206. During this welding process the material to be welded is engaged by pin tool 214 and is plasticized due to the rotation of pin tool 214. The rotation of pin tool 214 also causes a portion of the plasticized material to tend to migrate to an area 230 between an outer diameter of pin tool 214 and an inner diameter of shoulder tool 206.

Figure 7:
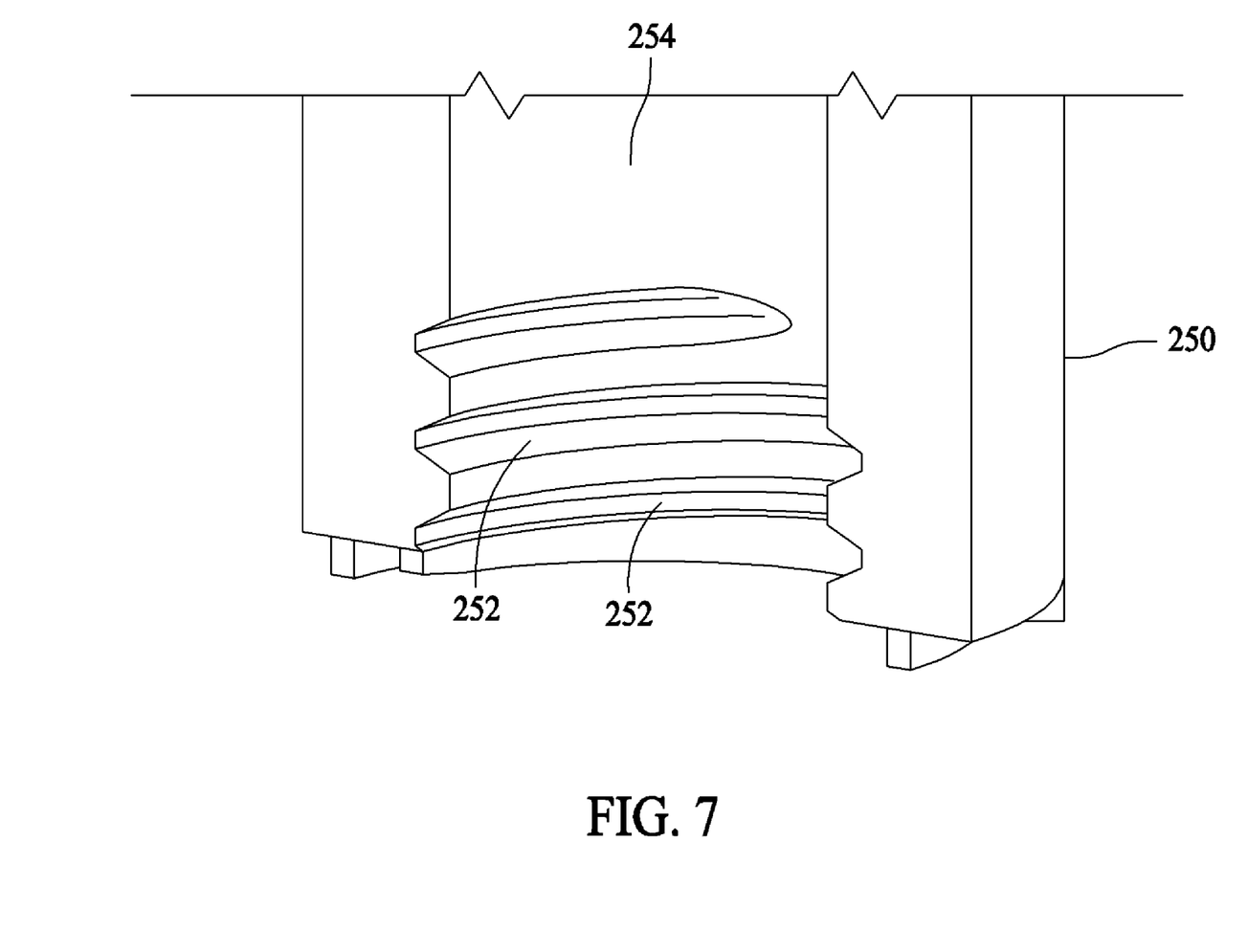
FIG. 7 is a detailed cross-sectional view of the shoulder tool configured with helical grooves therein.

FIG. 7 is a detailed cross-sectional view of a shoulder tool 250 configured with helical grooves 252 formed within an inner diameter 254 of shoulder tool 250. Helical grooves 252 provide a mechanism through which material migrating up through passageway 230 is forced back down into a welding zone adjacent pin tool 214. Helical grooves 252 are sometimes referred to as material control grooves. The rotation of pin tool 214 and shoulder tool 206 both (shown in FIG. 6) results in material M rotating within the narrow passageway 230 as shown in FIG. 6. The rotation of the material M in passageway 230 coupled with grooves 252 and the rotation of the material results in the material being pushed, or forced, back down into the welding zone adjacent bottom portion 220 of pin tool 214. In a specific embodiment, grooves 252 are approximately 0.017 inch in depth and have a pitch of 0.005 inch.

Figure 8:
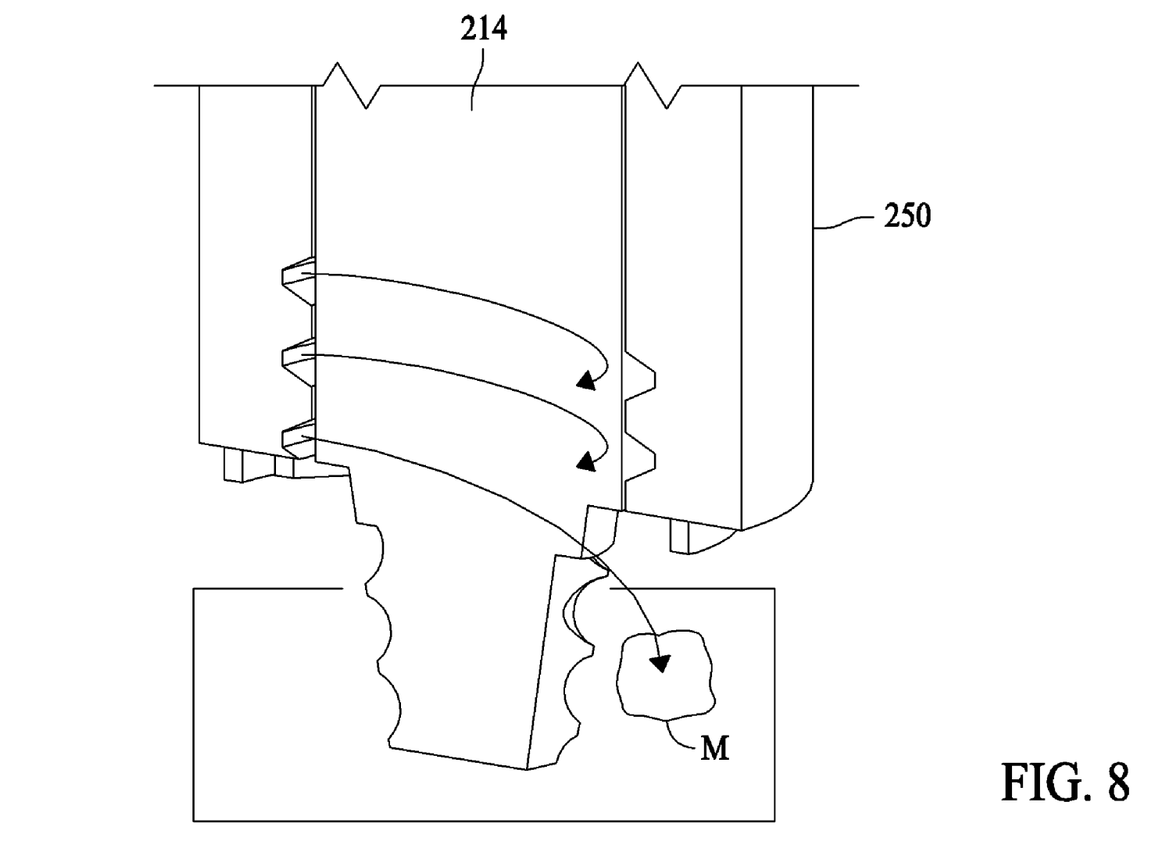
FIG. 8 is a detailed cross-sectional view illustrating an effect of the helical grooves on the migration of plasticized material.

FIG. 8 is a detailed cross-sectional view of shoulder tool 252 and a pin tool 214 and illustrates an effect of helical grooves 252 formed within shoulder tool 250 on the migration of plasticized material M in a continuous path retractable pin tool welding process. Helical grooves 252 define a threaded area located on the inner diameter of shoulder tool 250 adjacent to a pin tool 214. The pin tool 214 and shoulder tool 250 are independently driven and are rotating before pin tool 214 is inserted into the interface between the materials to be welded. As the pin 214 tool proceeds to a preprogrammed position or load controlled depth, plasticized material M (i.e., flash) is volumetrically displaced around the pin tool 214. As shoulder tool 250 engages the surface to be welded, and pin tool 214 traverses along a preprogrammed material interface path, softened flash material M migrates up pin tool 214 between the outer diameter of pin tool 214 and the adjacent inner diameter 254 of shoulder tool 250. As shown in FIG. 8, independent pin tool 214 and shoulder tool 250 rotation and helical grooves 252 formed in shoulder tool 250 work concurrently and to push or guide flash material M back into a welding zone 270 reducing an amount of flash material. With respect to retractable pin tool friction stir welding devices, pin tool 214 is referred to as a rotational assembly and shoulder tool 250 is referred to as a stationary assembly.

While described herein with respect to grooves formed in a stationary assembly, is to be understood that other configurations may be utilized to push flash material back into a welding zone. Specifically, rather than the stationary assembly, the rotational assembly may be formed with the above described material control grooves. In other embodiments, material control protrusions with dimensions similar to the above described grooves may be formed on the rotational assembly or the stationary assembly. In any of the embodiments, flash material engaging the grooves or protrusions coupled with the rotation of the rotational assembly causes the plasticized flash material to be guided back into a welding zone.

While described herein with respect to a spot welding apparatus and a retractable pin welding apparatus, it is to be understood that the foregoing description can be applied to other friction stir welding applications including any friction stir welding process where either the pin tool is fixed with respect to a shoulder tool or friction stir welding processes where the pin tool and shoulder tool move with respect to one another to provide tapered welds. The reduction of lost material in the various embodiments thereby result in enhanced weld quality, surface finish and weld integrity. The finished products in any of these embodiments is a welded material or article of manufacture that has been joined in a friction stir welding process where the welded material has a larger volume of welded material due to less flash material being lost due to the welding process as above described.

While the invention has been described in terms of various specific embodiments, those skilled in the art will recognize that the invention can be practiced with modification within the spirit and scope of the claims.

What is claimed is:

1. A friction stir welding apparatus comprising:
a first assembly comprising a bore therethrough, said bore defining an inner diameter; and
a second assembly comprising a welding end, a first portion of said second assembly including said welding end extending through said bore, a second portion of said second assembly comprising a substantially cylindrical surface that is adjacent said inner diameter,
said substantially cylindrical surface comprising material control threading arranged along a line substantially parallel to said second assembly; and
said inner diameter-comprising a smooth surface such that rotation of either said first assembly or said second assembly and said material control threading will cause plasticized material from a welding process that has entered an area between the cylindrical surface and said inner diameter to move towards a welding zone located proximate said welding end of said second assembly wherein the second portion is discrete from the first portion and wherein the material control threading is surrounded by the smooth surface of the inner diameter.

2. A friction stir welding apparatus according to claim 1 wherein said apparatus is a friction stir spot welding apparatus, said second assembly comprising a pin tool and a shoulder tool, and said first assembly comprising a clamping anvil that includes said inner diameter.

3. A friction stir welding apparatus according to claim 2 wherein said material control threading comprises grooves formed in said shoulder tool of said second assembly, said grooves adjacent said clamping anvil, said grooves, based on rotation of said shoulder tool, positioned to guide plasticized material back into the welding zone.

4. A friction stir welding apparatus according to claim 2 wherein said material control threading comprises protrusions formed on said shoulder tool of said second assembly, said protrusions adjacent said inner diameter, said protrusions, based on rotation of said shoulder tool, positioned to guide plasticized material back into the welding zone.

5. A friction stir welding apparatus according to claim 2 wherein said shoulder tool comprises an outer diameter adjacent said inner diameter of said clamping anvil, said material control threading comprising at least one of grooves formed in said outer diameter of said shoulder tool and protrusions extending from said outer diameter of said shoulder tool, said protrusions and said grooves, based on a rotation of said shoulder tool, positioned to guide plasticized material entering into an area between said shoulder tool and said clamping anvil back into the welding zone.

6. A friction stir welding apparatus according to claim 1 wherein said apparatus is a retractable pin tool friction stir welding apparatus, wherein said first assembly comprises a shoulder tool that includes said inner diameter and said second assembly comprises a pin tool comprising said substantially cylindrical surface.

7. A friction stir welding apparatus according to claim 6 wherein said material control threading comprises grooves formed in said substantially cylindrical surface of said pin tool, said grooves adjacent said inner diameter of said shoulder tool, said grooves, based on rotation of said pin tool, positioned to guide plasticized material back into the welding zone.

8. A friction stir welding apparatus according to claim 6 wherein said material control threading comprises a plurality of protrusions formed on said substantially cylindrical surface of said pin tool, said protrusions adjacent said inner diameter of said shoulder tool, said protrusions, based on rotation of said pin tool, positioned to guide plasticized material back into the welding zone.

9. A friction stir welding apparatus according to claim 6 wherein said substantially cylindrical surface of said pin tool comprises an outer diameter adjacent said inner diameter of said shoulder tool, said material control threading comprising at least one of grooves formed in said outer diameter of said pin tool and protrusions extending from said outer diameter of said pin tool, said protrusions and said grooves, based on a rotation between said pin tool and said shoulder tool, positioned to guide plasticized material entering into an area between said shoulder tool and said pin tool back into the welding zone.

10. A friction stir welding apparatus according to claim 1 wherein said material control threading comprises a plurality of grooves formed in said substantially cylindrical surface of said second, said grooves, based on rotation between said first assembly and said second assembly, operable to guide any flash material back into the welding zone.

11. A friction stir welding apparatus comprising:
a rotational assembly comprising an outer diameter that defines a substantially cylindrical surface and a welding end, said rotational assembly comprising material control threading formed along the substantially cylindrical surface arranged along a line substantially parallel to the rotational assembly, said material control threading separate from any threading associated with said welding end; and
a non-rotational assembly comprising a bore therethrough that defines a substantially smooth inner surface, the inner surface substantially adjacent to said material control threading, rotational interaction between said material control threading and the substantially smooth inner surface operable to guide any flash material from a friction stir welding process back into a welding zone proximate said welding end wherein the material control threading is surrounded by the substantially smooth inner surface.

12. A friction stir welding apparatus according to claim 11 wherein said material control threading comprises a plurality of grooves formed along the substantially cylindrical surface.

13. A friction stir welding apparatus according to claim 11 wherein said material control threading comprises a plurality of protrusions formed along the substantially cylindrical surface.

14. A friction stir welding apparatus according to claim 11 wherein said apparatus comprises a friction stir spot welding apparatus, said non-rotational assembly comprising a clamping anvil, and said rotational assembly comprising a pin tool and a shoulder tool.

15. A friction stir welding apparatus according to claim 11 wherein said apparatus comprises a retractable pin tool friction stir welding apparatus, said non-rotational assembly comprising a shoulder tool, and said rotational assembly comprising a pin tool.

16. A friction stir welding apparatus according to claim 11 wherein said material control threading formed in a direction opposite a direction of rotation of said rotational assembly.

* * * * *